Jan. 26, 1954  M. SILGE  2,667,103
ILLUMINATING MEANS FOR MICROSCOPES
Filed July 5, 1949  2 Sheets-Sheet 1
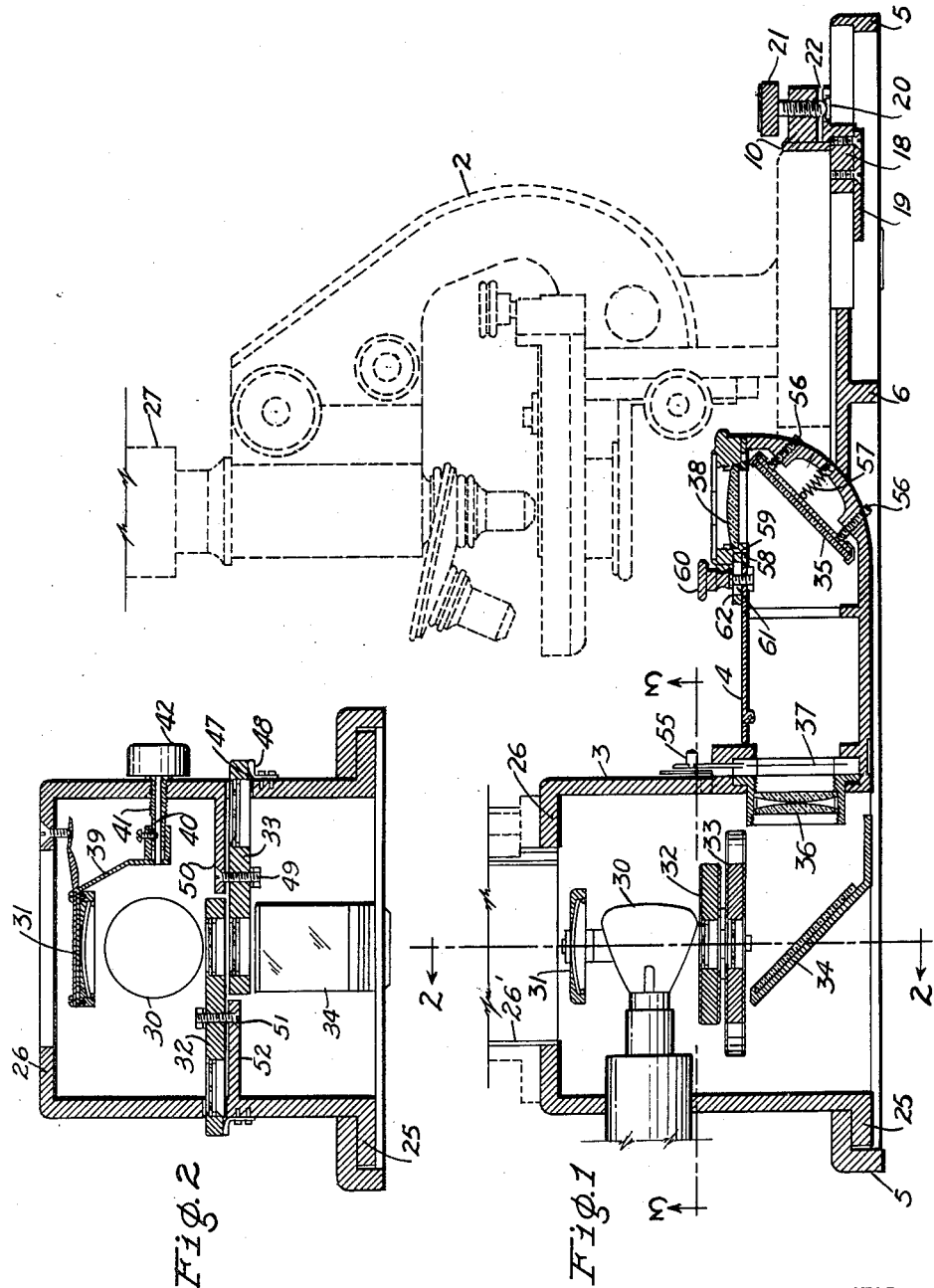
INVENTOR.
Martin Silge
BY
A. Schapp

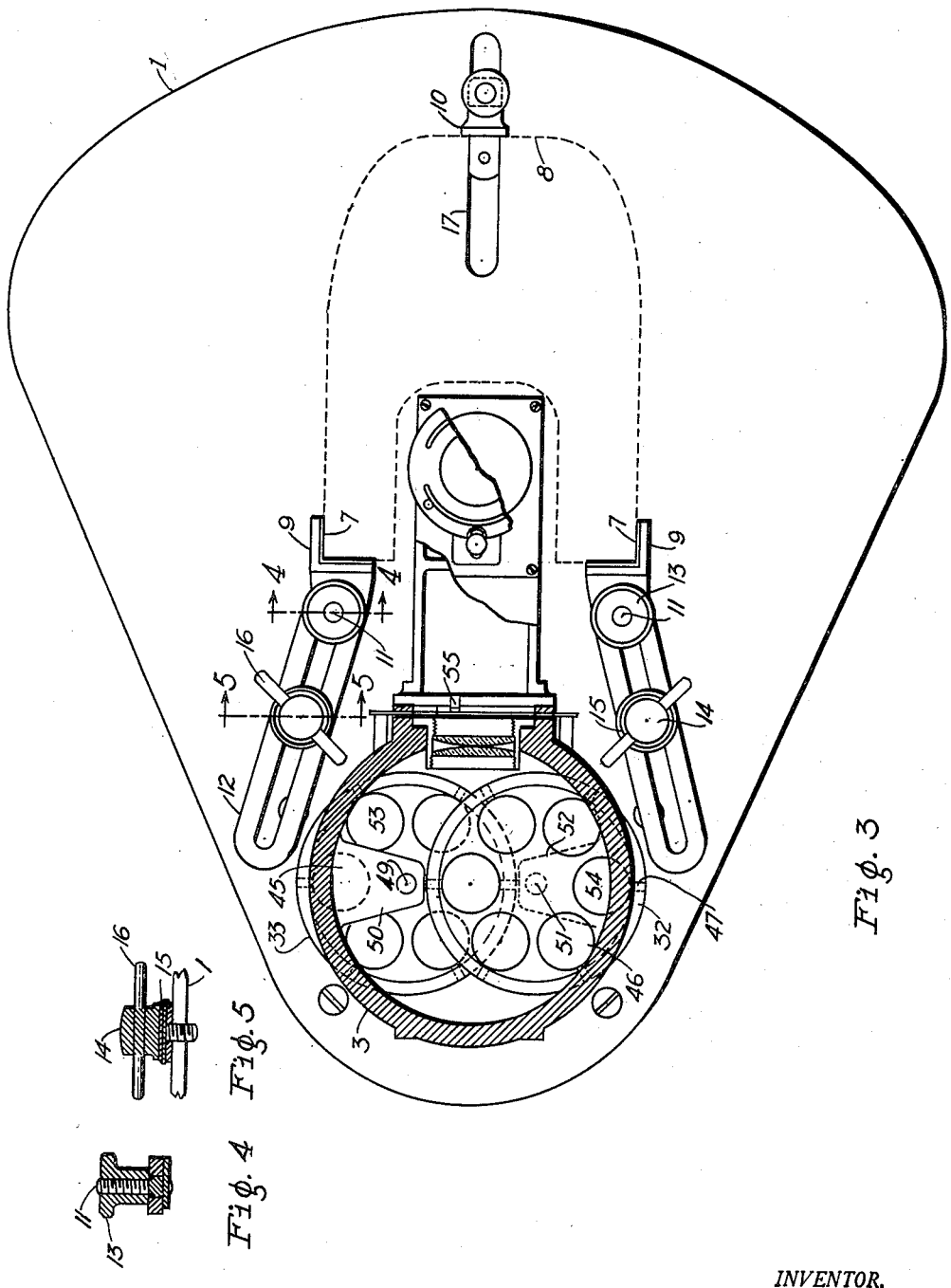

Patented Jan. 26, 1954

2,667,103

UNITED STATES PATENT OFFICE 2,667,103

ILLUMINATING MEANS FOR MICROSCOPES

Martin Silge, Oakland, Calif.

Application July 5, 1949, Serial No. 103,121

2 Claims. (Cl. 88—40)

The present invention relates to improvements in illuminating means for a microscope and its principal object is to provide a common base for the entire illuminating system and the microscope system whereby both systems are definitely related and positioned with respect to one another and any desired adjustments may be made in either of the two systems without disturbing the relation between the same.

It is further proposed to provide an illuminating system in which all the parts are integrated in a single structure which at the same time serves as a base for the microscope.

It is further contemplated to provide adjustable means on the base for positioning the microscope with respect to the illuminating system, this adjusting means being arranged to accommodate different types and sizes of microscopes and to bring their respective optical axes into proper relationship with respect to the light beam of the illuminating system.

It is further proposed to arrange the positioning means in such a manner that once it has been adjusted to a definite microscope, the latter may be easily removed and re-inserted upon operation of a single thumb screw, with the assurance that upon re-insertion it will occupy the identical position it previously occupied.

It is a further object to introduce certain control elements into the illuminating system whereby the use of the microscope for various purposes is greatly facilitated.

In this respect it is particularly proposed to provide means for controlling the light intensity of the illuminating system without interfering with the color temperature of the light. My invention, while generally useful for mere visual observation of the specimen under consideration, is particularly intended for use in photomicrography. Color films used in this process are balanced to a definite color temperature of the source of light and my intensity control is arranged in such a manner that it operates independently of the color temperature of the source of light and leaves the latter unaffected.

It is further proposed to provide, in connection with the illuminating system, certain color filters which may be selectively introduced in the path of the light beam whereby certain portions of the visible spectrum may be filtered to provide a convenient means for selecting a color of the illuminating beam suitable for black and white photomicrography and visual observation through the microscope.

And finally, it is proposed to introduce additional control elements into the path of the beam of light including a condensing system with an iris diaphragm and an auxiliary condenser located beneath the sub-stage of the microscope which serves to form an image of the field diaphragm in the plane of the microscopic object, this auxiliary condenser being mounted with freedom of universal adjustment in a horizontal plane so as to permit of ready positioning of the image of the field diaphragm in the field of vision of the microscope.

Further objects and advantages of my invention will appear as the specification proceeds, and the novel features of my invention will be fully defined in the claims attached hereto.

The preferred form of my invention is illustrated in the accompanying drawing, in which Figure 1 shows a vertical longitudinal section through my illuminating means, the microscope and a portion of the camera being shown in dotted lines, Figure 2, a transverse section taken along line 2—2 of Figure 1, Figure 3, a horizontal section taken along line 3—3 of Figure 1, Figure 4, a vertical detail section taken along line 4—4 of Figure 3, and Figure 5, a vertical detail section taken along line 5—5 of Figure 3.

While I have shown only the preferred form of my invention, I wish to have it understood that various changes and modifications may be made within the scope of the claims attached hereto without departing from the spirit of the invention.

Referring to the drawings in detail, my invention comprises in its principal physical parts a base 1, means for mounting a microscope 2 thereon, a light column 3 mounted on the base in spaced relation to the microscope and a light channel 4 extending radially from the light column to a location underneath the optical system of the microscope.

The base 1 is preferably made substantially triangular in shape, with the corners rounded as shown to provide an attractive appearance and convenience in use. It consists of a horizontal plate slightly spaced from a supporting surface by means of an all-around flange 5 and suitable webs 6 inside of the flange.

The wider portion of the base is reserved for the mounting means for the microscope, the supporting structure of which usually provides two rear corners 7 on opposite sides of the microscope tube and a rounded or otherwise shaped front section 6 diametrically opposite the said tube.

In my invention I provide a three-point positioning means for the supporting structure of the microscope intended to accommodate substantially any form of supporting structure. This means comprises two vertically disposed angles 9 adapted to receive the rear corners of the microscope support, and a sliding block 10 adapted to bear on the front section of the support and to urge said support firmly upon the angles 9. The angles may be referred to as contour pieces, since they are intended to fit the contour of the microscope support.

The angles are pivoted upon posts 11 rising from the front ends of slotted slide members 12 and may be firmly secured upon said members in adjusted position by means of nuts 13 threaded upon the posts and having knurled heads for convenience of operation.

The slotted slides are mounted upon the base with freedom of sliding and swinging movement by means of screws 14 threaded into the base on opposite sides of the channel and extending through the slots, suitable washers 15 being interposed between the screw heads and the slides and the screw heads being provided with finger pieces 16 to facilitate manipulation thereof. The slides may thus be firmly secured in adjusted positions by operation of the screw heads.

The block 16 is mounted for sliding movement with respect to a slot 17 (Figure 3) arranged in the base in the vertical plane of the optical system, the block having a guide piece 18 riding in the slot and a bottom plate 19 bearing against the underface of the base. The block is formed with a bottom groove accommodating a washer 20, and a screw 21 is threaded into the block for bearing upon the washer to force the same upon the edges of the slot for locking the block in adjusted position. The block is formed with a horizontal slot 22 immediately above the groove to provide tension for locking the screw. The washer is held in position in the groove by means of a small pin (not shown) extending into the block, or by any other suitable means.

The column 3 is hollow and preferably cylindrical in shape and is mounted to rise vertically from the front portion of the base, in spaced relation to a microscope mounted on the base in the manner described. It is secured upon the base by means of a bottom flange 25 and has a top flange 26 adapted to have a standard 26' mounted thereon. The latter is used for supporting a camera 27 over the microscope and in optical alinement therewith. Only a small portion of the camera is shown in the form of tubular, light-proof connector for the microscope to indicate that the optical axis of the camera is in alinement with the optical system of the microscope and with the illuminating system.

The channel 4 extends radially from the lower portion of the column in the direction of the slot 17 and in alinement therewith and in such a manner that the microscope may be adjusted to proper position with respect to the outer end thereof so as to bring the optical axis of the microscope into proper relationship to the optical axis of the illuminating system.

My illuminating system is accommodated in the column and the channel and comprises in its principal features a source of light 30 mounted in the upper part of the column, a concave reflector 31 mounted over the source, a pair of light control members 32 and 33 mounted underneath the source, a pair of reflectors 34 and 35 mounted with respect to the channel to reflect the rays of light into the channel axially and upwardly at the outer end of the channel, a condensing system 36 interposed between the reflectors and including an iris diaphragm 37, and an auxiliary condenser 38 mounted above the second reflector 35.

The source of light 30 may be in the form of an electric lamp suitably connected to any desired source of electrical energy. For certain purposes the lamp should be carefully selected with respect to color temperature, one of the most important features of the present invention being to effect certain controls over the beam of light without interfering with light characteristics incident to color temperature.

The reflector 31 is mounted on an arm 39 which latter is secured upon a shaft 40 mounted in a bearing 41 in the wall of the column and operable by means of a knob 42 for swinging sidewise into inactive position.

Underneath the lamp I provide two rotary wheels 32 and 33 mounted in partly overlapping relation, each of the wheels having an annular series of circular windows 45—46 (Figure 3) and the wheels being mounted in such a manner that the centers of any selected pair of windows may be brought into the axis of the illuminating beam. Both wheels have outer sections projecting slightly beyond the periphery of the column so that they may be actuated from the outside of the column. Each of the wheels has a series of notches 47 in the bottom face of the rim, and the column has a spring finger 48 for each wheel mounted upon the outside thereof, the spring fingers and the notches being related for each finger to engage in a notch, when a related window has reached central position with respect to the light beam.

The two wheels are mounted eccentrically with respect to the path of the light beam, the upper wheel 32 being mounted on a shaft 51 in a bracket 52 projecting inwardly from the wall of the column, and the wheel 33 being mounted on a diametrically opposite shaft 49 supported in a bracket 50 projecting inwardly from an opposing section of the column wall.

The windows of the upper wheel 32 are intended for producing desired light diffusing effects. One of the windows is preferably left open, in case no dimming effect is desired, but the other windows have colorless diffusion discs 53 mounted therein, successive discs being of progressively increasing diffusive power. Each diffusion disc, when placed in the beam of light close to the lamp, is illuminated by the latter and is then used as the source of light for the illuminating system.

The windows of the lower wheel 33 are intended to produce certain color filtering effects. One of them may again be left open for use in case no filtering effect is desired, but the others are provided with color filtering discs 54 of varying characteristics and degrees of intensity.

Thus desired light intensity control and desired filtering effects may be obtained, without changing the color temperature of the original source, which is of great importance when color films are to be used which are balanced to a definite color temperature.

The beam of light issuing from the selected windows or discs is reflected by the reflector 34, passes through the condensing system 36 and the iris diaphragm 37, controllable by a knob 55 movable alongside of the column 3, and is again reflected upward by the reflector 35, the position of which may be adjusted by operation of either one of two screws 56 working against a spring 57.

An auxiliary condenser 38 is mounted over the channel opening 58 with freedom of universal adjustment in a horizontal plane, the condenser having an annular flange 59 extending into the opening 58, and the flange being of smaller diameter than the light opening. The condenser may be locked in adjusted position by means of a set screw 60 threaded into the channel wall and passing through a slot 61 in a tongue 62 projecting from the condenser.

In operation, the microscope may be readily positioned to bring its optical system into proper alinement with a beam of light issuing from the illuminating system by proper adjustment of the angles 9 and the block 10. Once the angles 9 have been properly adjusted and fixed for a certain microscope, the latter may be easily removed and re-inserted upon operation of the block 10, with the definite assurance that it will always occupy the same position.

The lamp may be selected to have desired color temperature characteristics and proper operation of the upper wheel will give complete control over the light intensity, without any change in the characteristics incident to color temperature. Desired color filtering effects may be obtained by operation of the lower wheel.

The auxiliary condenser located beneath the sub-stage of the microscope serves to form an image of the field diaphragm in the plane of the microscopic object under observation and is mounted with freedom of universal adjustment in its plane so as to permit of ready positioning of the image of the field diaphragm in the field of vision.

I claim:

1. In a combination of the character described, a flat base, a straight tubular housing rising therefrom and having an opening in the wall thereof adjacent the base, a lamp mounted in the housing, a light channel projecting sidewise from said opening and having a light opening spaced from the housing and presented upwardly, an optical system in the housing and the channel for directing rays of light emanating from the lamp upwardly through the light opening in the channel, the base having a slot outside of and in alinement with the channel, and means for mounting a microscope having a heel and a pair of spaced toes adapted to straddle the channel on said base, comprising a pair of screws threaded into the base on opposite sides of the channel substantially at its connection with the column, a pair of slotted members swingable and slidable on said screws and fastenable thereby in adjusted position, a pair of corner pieces swingable on the slotted members and securable thereto in adjusted position and operable to abut against the toes for anchoring the same, and a block slidable in the slot and operable to engage against the heel of the microscope and having means for locking the same in adjusted position.

2. A combination as defined in claim 1, in which the base is substantially triangular in shape and in which the housing is mounted in the apex of the triangle and the channel and the slot are located on the center-line of the triangle.

MARTIN SILGE.

References Cited in the file of this patent

UNITED STATES PATENTS

| Number | Name | Date |
| --- | --- | --- |
| 795,470 | Anger | July 25, 1905 |
| 1,161,556 | Watkins | Nov. 23, 1915 |
| 1,461,367 | Ott et al. | July 10, 1923 |
| 1,907,750 | Jarnette | May 9, 1933 |
| 1,907,803 | Harvey et al. | May 9, 1933 |
| 1,960,554 | Siedentopf | May 29, 1934 |
| 2,077,809 | Riepert | Apr. 20, 1937 |
| 2,135,870 | Fassin | Nov. 8, 1938 |
| 2,146,506 | Maisch | Feb. 7, 1939 |
| 2,185,926 | Senecal | Jan. 2, 1940 |
| 2,231,719 | Hughey | Feb. 11, 1941 |
| 2,289,575 | Critoph et al. | July 14, 1942 |
| 2,325,350 | West | July 27, 1943 |
| 2,329,897 | Heinicke | Sept. 21, 1943 |
| 2,351,736 | Benford | June 20, 1944 |
| 2,435,300 | Weiskopf | Feb. 3, 1948 |
| 2,471,879 | Lowber et al. | May 31, 1949 |
| 2,498,392 | Boyle | Feb. 21, 1950 |
| 2,530,352 | Gallasch | Nov. 14, 1950 |

FOREIGN PATENTS

| Number | Country | Date |
| --- | --- | --- |
| 395,649 | Great Britain | July 20, 1933 |